United States Patent [19]

Kirk

[11] Patent Number: 5,301,241
[45] Date of Patent: Apr. 5, 1994

[54] IMAGE COMPRESSION METHOD AND APPARATUS EMPLOYING PRINCIPAL COMPONENT ANALYSIS

[75] Inventor: Richard A. Kirk, Hertfordshire, England

[73] Assignee: Crosfield Electronics Limited, Hertfordshire, United Kingdom

[21] Appl. No.: 665,122

[22] Filed: Mar. 6, 1991

[30] Foreign Application Priority Data

Mar. 6, 1990 [GB] United Kingdom ............... 9004978

[51] Int. Cl.$^5$ .............................................. G06K 9/36
[52] U.S. Cl. ...................................... 382/56; 382/17
[58] Field of Search ................. 382/56, 17; 358/433, 358/432

[56] References Cited

U.S. PATENT DOCUMENTS 4,920,426 3/1990 Hatori et al. .................. 358/433
4,962,540 10/1990 Tsujiuchi et al. .................. 382/17

OTHER PUBLICATIONS

Ali Hababi & Guner S. Robinson, "A Survey of Digital Picture Coding", *Computer,* May 1974, pp. 22–33.
"Electronic Hardware Implementation of the Principal Components Transformation for Multichannel Image Data", A. A. D. Canas, IEE Proceedings, vol. 131, pp. 761–768, No. 7, Dec. 1984.
"Adaptive Transform Coding of Four-Color Printed Imaged", M. Gilge, IEEE, pp. 1374–1377, 1987 International Conference on Acoustics, Speech, and Signal Processing, Apr. 6–9, 1987, Dallas, Texas.
"Bandwidth Compression of Images Using Transform Techniques", T. A. Soame, G.E.C. Journal of Science and Technology, vol. 48 (1982), No. 1, pp. 17–23, Rugby, Great Britain.
"Transform Picture Coding", P. Wintz, Proceedings of the IEEE, vol. 60, No. 7, Jul. 1971, pp. 809–820.
"IEEE Transactions on Acoustics, Speech and Signal Processing", vol. ASSP-32 (1984) Feb., No. 1, New York, pp. 173–177.

*Primary Examiner*—David K. Moore
*Attorney, Agent, or Firm*—Sughrue, Mion, Zinn, Macpeak & Seas

[57] ABSTRACT

A method and apparatus for compressing digital data defining the colour component content of pixels of a coloured image, the apparatus comprises a processor (1) for performing a principal component analysis on each of a number of non-overlapping blocks of pixels making up the image to determine the principal component vectors corresponding to the block; for rounding the principal component vectors to a fixed set of intervals; for transforming the original pixel data into the colour space defined by the rounded principal component vectors; for performing a compression algorithm on the transformed pixel data; and for performing a separate compression algorithm on the rounded principal component vector values.

5 Claims, 2 Drawing Sheets

IMAGE COMPRESSION METHOD AND APPARATUS EMPLOYING PRINCIPAL COMPONENT ANALYSIS

FIELD OF THE INVENTION

The invention relates to methods and apparatus for compressing digital data defining the colour component content of a coloured image.

DESCRIPTION OF THE PRIOR ART

Modern digital representations of coloured images typically comprise a very large volume of data. For example, there may be 1800×1800 pixels per square inch each of which is defined by a number of colour components which themselves may take any of 256 different values. This degree of definition is very useful for achieving accurate image colours but leads to problems when attempting to store the data or to transmit it to a remote site. As a consequence, various proposals have been made in the past to compress the data. In general, compression techniques address each colour component separately. However, when looking at the separations of a typical four colour image (defined by cyan, magenta, yellow and black (CMYK) components for example) it is usually possible to recognise all the features from any of the separations—the data of any separation will contain all the fine edge position details except in those rare cases where the edge has no contrast in one separation. If this redundancy exists in the compressed image, then the information is not being compressed as much as it could be.

For example, the K values are not unique but can be deduced from the CMY values. A good approach in the general compression case would be to measure the correlations between the separations over the entire image, and seek a new set of colour axes where there is no correlation. Where one or more separations are redundant or nearly redundant, we would expect the transformation to the new set of colour axes to have little or no information in one or more of the new colour channels.

Compression by measuring correlation over an entire image and choosing a new set of axes (Principal Component Analysis) has been used successfully for satellite images (A.A.D. Canas, IEE Proceedings, Vol 131, PtF. No 7 December 1984, pp 761-767). However, for scanned image data, for example, this technique does not achieve optimum compression.

SUMMARY OF THE INVENTION

In accordance with one aspect of the present invention, a method of compressing digital data defining the colour component content of pixels of a coloured image comprises, for each of a number of non-overlapping blocks of pixels making up the image, performing a principal component analysis on the pixel block to determine the principal component vectors corresponding to the block; rounding the principal component vectors to a fixed set of intervals; transforming the original pixel data to the colour space defined by the rounded principal component vectors; performing a compression algorithm on the transformed pixel data; and performing a separate compression algorithm on the rounded principal component vector values.

In accordance with a second aspect of the present invention, apparatus for compressing digital data defining the colour component content of pixels of a coloured image comprises processing means for performing a principal component analysis on each of a number of non-overlapping blocks of pixels making up the image to determine the principal component vectors corresponding to the block; means for rounding the principal component vectors to a fixed set of intervals; transform means for transforming the original pixel data into the colour space defined by the rounded principal component vectors; first compression means for performing a compression algorithm on the transformed pixel data; and second compression means for performing a separate compression algorithm on the rounded principal component vector values.

By selecting small blocks of pixels within the image, in general there will be less variation in colour throughout the block so that the data can be significantly compressed. In many cases where the block only contains shades of a single colour or a simple boundary then almost all of the information is in the major principal component. We have found, surprisingly, that although separate sets of principal component vectors are generated for each pixel block as compared with the single set for the entire image, it is possible to compress significantly the data defining the principal component vector values themselves which, in combination with a very significant compression of the data within each image block, results overall in a greater compression ratio than is achieved by using the technique described in the paper mentioned above.

Preferably, the principal component analysis comprises determining a covariance matrix for the pixel block; and determining the eigenvectors and eigenvalues for the covariance matrix, the eigenvectors constituting the principal component vectors.

In the preferred method, the degree of rounding is determined in accordance with the amount of information, or "energy", of the corresponding block. Typically, each block may be classified into one of a number of different classes depending upon its "energy", each class defining a degree of truncation or compression for the eigenvector and the transformed colour values.

The "energy" of a block represents the variation in colour component values and so may be defined in terms of the eigenvalue.

The data defining the eigenvectors can be compressed significantly since many of the eigenvectors with the lower eigenvalues will have no non-zero AC components. In the preferred method, the eigenvector corresponding to the largest eigenvalue is initially selected and the vector values truncated to a level determined in accordance with the largest eigenvalue, the truncation process being repeated for each for the other eigenvectors selected in order of their eigenvalue magnitudes until a truncated eigenvector has no non-zero AC values whereupon all remaining eigenvector values are rounded to zero.

The compression of the eigenvectors is preferably carried out prior to transforming the pixel data into the colour space defined by the eigenvectors so that upon decompression an accurate regeneration of pixel values is achieved. However, the compression of the eigenvectors could be performed after the transform step.

The step of performing a compression algorithm on the transformed pixel data may have any conventional form but preferably includes a further transformation into the frequency domain followed by a run length encoding process. The finally compressed data may be stored or transmitted to a remote site.

The processing means and transform means are preferably provided by a suitably programmed computer although hard wired circuits could also be used.

BRIEF DESCRIPTION OF THE DRAWINGS

An example of a method and apparatus according to the invention will now be described with reference to the accompanying drawings, in which.

DETAILED DESCRIPTION OF AN EMBODIMENT

Figure 1:
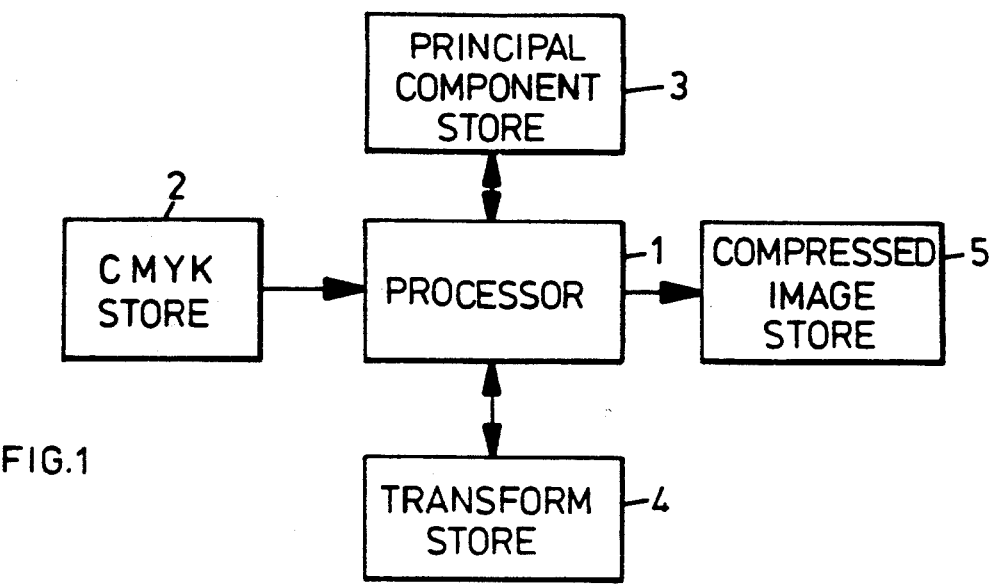
FIG. 1 is a block diagram of the apparatus.

The apparatus comprises a processor 1 which is coupled to a store 2 in which digital data defining the colour component content of an image is stored. This image is defined by a large number of pixels each of which has a colour defined by four colour components (cyan, magenta, yellow and black) each having a value in the range 0-255. The processor 1 is also connected to a principal component store 3, a transform store 4 and a compressed image store 5. The use of these stores 3-5 will be described in more detail below.

Figure 3:
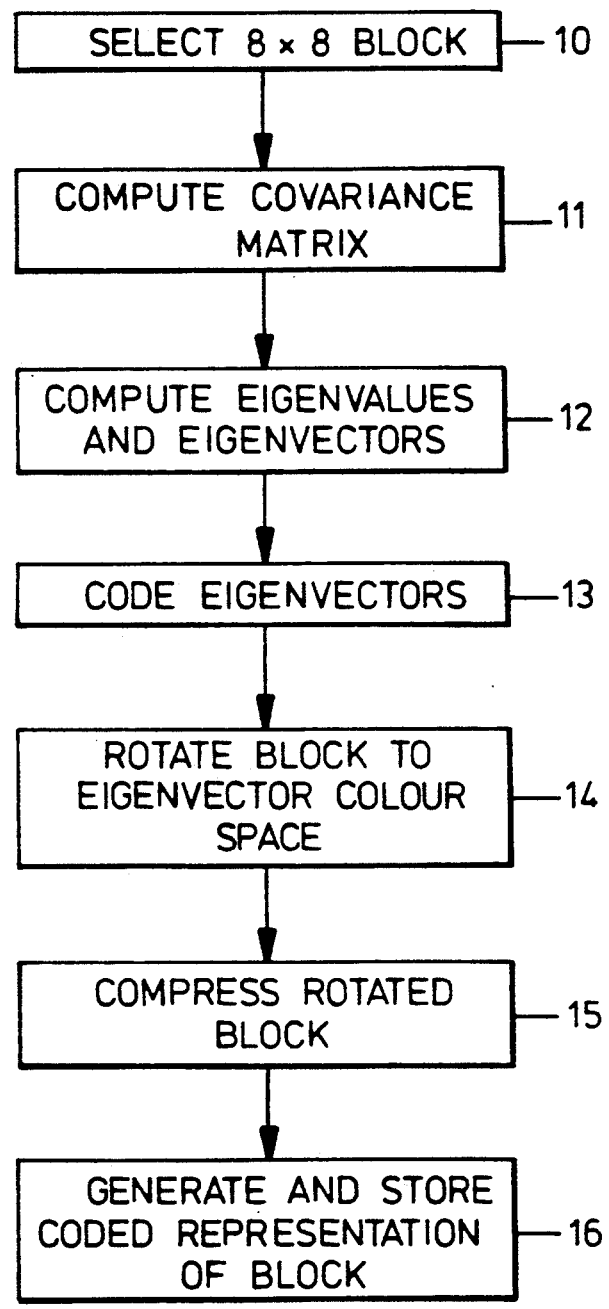

The processor 1 accesses in series 8×8 pixel blocks from the store 2 (step 10, FIG. 3).

The next stage (step 11) is to measure all the single component terms (CMYK) in the 8×8 block and from these measurements calculate the sums of all the single component terms and the sums of all the cross product terms (CC, CM, CY, CR, and so on). The covariance matrix COV (X,Y) can then be calculated from $$\text{COS}(X,Y) = \frac{\Sigma X \times Y}{64} - \frac{\Sigma X \times \Sigma Y}{64 \times 64}$$

As COV(X,Y)=COV(Y,X) it is necessary to calculate only 10 values for the matrix as the others can be obtained by symmetry. This symmetry can be used when calculating the eigenvectors.

In calculating the second term of the covariances, the DC values are calculated. These values are kept for later.

Now the transform matrix E that eliminates the correlation between the components is found (step 12). This is equivalent to the unit matrix that diagonalizes COV...

$$E \cdot \underset{ij}{COV} \cdot \underset{jk}{E}^{-1} = \text{const}(i = 1), \text{else } 0$$

Multiplying both sides by E gives the standard eigenvector equation. The principal components are therefore the eigenvectors of COV, each of which has a corresponding eigenvalue. As the transform matrix E is a unit matrix, the eigenvalues now represent the energies of each separation.

Before transforming the block data to the principal components defined by the eigenvectors, the eigenvectors themselves are coded or compressed. The degree of compression is related to the energy of the block concerned, the energy being defined as the sum of the eigenvalues. The possible block energies are divided into classes for the purpose to be described below.

In a step 13 the largest eigenvalue is determined and the corresponding eigenvector selected. That eigenvector, which will be made up of four components or values, is coded by selecting the component with the greatest magnitude and, if it is positive, negating the whole eigenvector. Then the position of the maximum component is coded by for example two bits and the remaining three values are then truncated to the number of bits associated with the class of the block. Typically, the number of bits will range from 6 for high energy blocks up to 10 for low energy blocks. The exact number of bits and the energy ranges for each class will be determined empirically.

After the first eigenvector has been coded, the same process is repeated with the next corresponding to the next highest eigenvalue until all the eigenvectors have been coded. Additional compression can be achieved if following the compression of a particular eigenvector the resultant values are reviewed. If there are no non-zero AC values then all the remaining eigenvectors can be rounded to zero.

Figure 2:
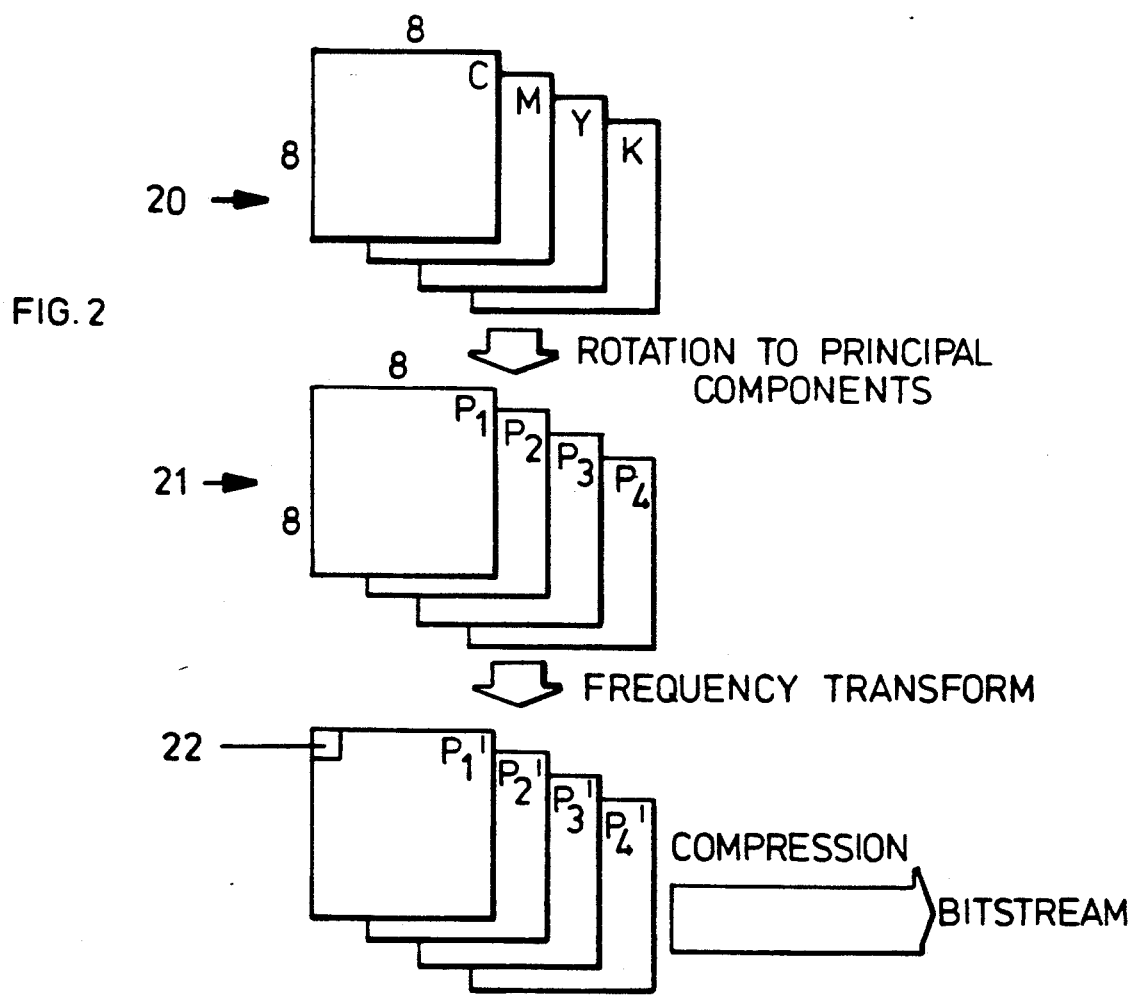
FIG. 2 illustrates the process schematically; and,
FIG. 3 is a block diagram showing the steps in the process.

The pixel block is then rotated or transformed (step 14) to the eigenvector colour space. This is done for each of the 8×8 squares of principal component values ($P_1$-$P_4$) independently by performing two one-dimensional passes in a conventional manner. This transform is illustrated in FIG. 2 which shows the original four colour separations 20 and the resultant four principal component planes 21. The rotated block is stored in the principal component store 3.

The effect of this rotation is to concentrate a majority of the image data into the first plane $P_1$ there being progressively less information in the successive planes.

The consequence of this is that in a step 15 during which a frequency transform is performed on the rotated pixel block, most of the AC values resulting from this frequency transform in the planes other than the first plane will be zero. The frequency transform generates for each plane a DC value 22 (FIG. 2) and a set of 63 AC values. The frequency transform block is stored in the transform store 4.

The DC values are extracted and the resultant AC values run length encoded using, for example, a Huffman coding technique. A final bit stream is produced for the block which comprises the four DC values, the coded eigenvectors each in the form of the two bit code, largest value and three truncated values, and the run length encoded pixel data. This bit stream is then stored (step 16) in the image store 5.

I claim:

1. Apparatus for compressing digital data defining the colour component content of pixels of a coloured image, the apparatus comprising a computer including means for performing a principal component analysis on each of a number of non-overlapping blocks of pixels making up the image to determine the principal component vectors corresponding to the block; a first memory for storing said principal component vectors; said computer further comprising means for rounding the principal component vectors to a fixed set of intervals; a second memory for, together with said computer, transforming the original pixel data into the colour space defined by the rounded principal component vectors and storing transformed pixel data; said computer further comprising means for performing a compression algorithm on the transformed pixel data; and a third memory for, together with said computer, performing a separate compression algorithm on the rounded principal component vector values and storing compressed image data.

2. An apparatus according to claim 1, wherein said means for performing principal component analysis comprises means for determining a covariance matrix for said pixel block; and means for determining the eigenvectors and eigenvalues for said covariance matrix, the eigenvectors constituting said principal component vectors.

3. An apparatus according to claim 2, wherein each block is classified into one of a number of different classes depending upon its "energy", each class defining a degree of truncation or compression for the eigenvectors and the transformed colour values.

4. An apparatus according to claim 2, further comprising means for selecting the eigenvector corresponding to the largest eigenvalue, means for truncating the vector values to a level determined in accordance with the largest eigenvalue, the truncation being repeated for each of the other eigenvectors selected in order of their eigenvalue magnitudes until a truncated eigenvector has no non-zero AC values, and means for rounding all remaining eigenvector values to zero.

5. An apparatus according to claim 2, wherein the compression of the eigenvectors is carried out prior to transforming the pixel data into the colour space defined by the eigenvectors so that upon decompression an accurate regeneration of pixel values is achieved.

* * * * *